(12) United States Patent
Lu

(10) Patent No.: US 11,711,248 B1
(45) Date of Patent: Jul. 25, 2023

(54) DIGITAL CIRCUIT FOR CORRECTING MISMATCHED IQ SIGNALS IN A BASEBAND RECEIVER

(71) Applicant: Rafael Microelectronics, Inc., Hsinchu County (TW)

(72) Inventor: Hsin-Yu Lu, Hsinchu County (TW)

(73) Assignee: Rafael Microelectronics, Inc., Hsinchu County (TW)

( * ) Notice: Subject to any disclaimer, the term of this patent is extended or adjusted under 35 U.S.C. 154(b) by 0 days.

(21) Appl. No.: 17/688,911

(22) Filed: Mar. 8, 2022

(51) Int. Cl.
*H04L 27/227* (2006.01)

(52) U.S. Cl.
CPC .................. *H04L 27/2273* (2013.01)

(58) Field of Classification Search
CPC .................................................. H04L 27/2273
See application file for complete search history.

(56) References Cited

U.S. PATENT DOCUMENTS

| 11,528,179 | B1 * | 12/2022 | Ayyappannair Radhadevi ........... H04L 27/2666 |
| 2009/0088120 | A1 * | 4/2009 | Ling .................. H04L 27/0014 455/314 |

* cited by examiner

*Primary Examiner* — Janice N Tieu
(74) *Attorney, Agent, or Firm* — Min-Lee Teng

(57) ABSTRACT

A digital circuit in a baseband receiver to compensate for the IQ mismatch by aligning the amplitude of $\tilde{I}$ with $\tilde{Q}$ and by aligning the phase of $\hat{Q}$ to be 90 degrees away from $\hat{I}$.

4 Claims, 4 Drawing Sheets

DIGITAL CIRCUIT FOR CORRECTING MISMATCHED IQ SIGNALS IN A BASEBAND RECEIVER

BACKGROUND OF THE INVENTION

1. Field of the Invention

The invention relates to a circuit for correcting mismatched IQ (In-phase and Quadrature) signals, and in particular, to a digital circuit for correcting mismatched IQ signals in a baseband receiver.

2. Description of the Prior Art

When the RF signals carrying IQ signals are received and down-converted to the base frequency, due to the PCB (Printed Circuit Board) layout, analog circuit layout and the variation of the I path and Q path, the IQ signals received at the base frequency are often mismatched.

Therefore, there is a need to have a solution to overcome the above-mentioned issue.

SUMMARY OF THE INVENTION

One objective of the present invention is to provide a digital circuit for correcting mismatched IQ signals in a baseband receiver on the fly without using a processor such as MCU (Microcontroller Unit) or DSP (Digital Signal Processor).

The present invention uses a digital circuit to evaluate the mismatch between I and Q channels after the IQ mismatched signals are sampled by ADC and to compensate for the amplitude and phase differences of the mismatched IQ signals by aligning the amplitude of $\tilde{I}$ with $\tilde{Q}$ and the phase of $\tilde{Q}$ to be 90 degrees away from $\tilde{I}$.

The present invention discloses a digital circuit for correcting mismatch IQ signals in a baseband receiver, wherein said mismatch IQ signals are represented by in-phase signal: $\tilde{I}$ and quadrature signal: $\tilde{Q}$, wherein each of the $\tilde{I}$ and $\tilde{Q}$ is in digital form, wherein the digital circuit comprises: a digital calibration circuit, for obtaining the ratio of the amplitude of $\tilde{I}$ to the amplitude of $\tilde{Q}$:$\varepsilon$ and the phase difference between $\tilde{I}$ and $\tilde{Q}$:$\varphi$, wherein $$\hat{\varepsilon}_{inv} = \frac{1}{\varepsilon};$$

and a digital correction circuit, for obtaining compensated signals: $\hat{I}$ and $\hat{Q}$, wherein for each time n:

$$\hat{I}(n) = \hat{\varepsilon}_{inv}(n) * \tilde{I}(n); \text{ and}$$

$$\hat{Q}(n) = -\hat{I}(n) * \tan(\hat{\varphi}(n)) + \sec(\hat{\varphi}(n)) * \tilde{Q}(n).$$

In one embodiment, the digital calibration circuit comprises a power calculator block that receives the signals $\tilde{I}$ and $\tilde{Q}$ and generates:

$\tilde{I}_{ABS\_avg}(n)$, $\tilde{Q}_{ABS\_avg}(n)$, $P_{I.P.}(n)$, and $P_{\tilde{I}}(n)$, wherein $\tilde{I}_{ABS\_avg}(n) = \text{Average}(|\tilde{I}(n)|);$ $\tilde{Q}_{ABS\_avg}(n) = \text{Average}(|\tilde{Q}(n)|);$ $P_{I.P.}(n) = \text{Average}(\tilde{I}(n) * \tilde{Q}(n));$ and $P_{\tilde{I}}(n) = \text{Average}((\tilde{I}(n))^2)$, wherein $$\hat{\varepsilon}_{inv}(n) = \text{Average}\left(\frac{\tilde{Q}_{ABS\_avg}(n)}{\tilde{I}_{ABS\_avg}(n)}\right); \text{ and}$$

$$\hat{\varphi}(n) = \text{Average}\left(\frac{P_{I.P.}(n)}{\hat{\varepsilon}_{inv}(n-1) * P_{\tilde{I}}(n)}\right).$$

In one embodiment, the digital correction circuit comprises a power correction block that receives $\tilde{I}(n)$ and $\hat{\varepsilon}_{inv}(n)$ and generates $\hat{I}(n)$, and a phase correction block that receives $\hat{\varphi}(n)$, $\tilde{Q}$ and $\hat{I}(n)$ and generates $\hat{Q}$, wherein $$\hat{I}(n) = \hat{\varepsilon}_{inv}(n) * \tilde{I}(n); \text{ and}$$

$$\hat{Q}(n) = -\hat{I}(n) * \tan(\hat{\varphi}(n)) + \sec(\hat{\varphi}(n)) * \tilde{Q}(n).$$

The detailed technology and above preferred embodiments implemented for the present invention are described in the following paragraphs accompanying the appended drawings for people skilled in this field to well appreciate the features of the claimed invention.

BRIEF DESCRIPTION OF DRAWINGS

The foregoing aspects and many of the accompanying advantages of this invention will become more readily appreciated as the same becomes better understood by reference to the following detailed description when taken in conjunction with the accompanying drawings, wherein.

DETAILED DESCRIPTION OF EMBODIMENT

The detailed explanation of the present invention is described as follows. The described preferred embodiments are presented for purposes of illustrations and description, and they are not intended to limit the scope of the present invention.

When the IQ-matched RF signal is received and down-converted to the base frequency, due to the PCB layout, analog circuit layout and the variation of the I path and Q path, the IQ signal received at the base frequency is often mismatched. The present invention evaluates the mismatches between I and Q channels after the IQ mismatched signals are sampled by ADC, wherein the amplitude and phase differences of the mismatched IQ signals are compensated by aligning the amplitude of $\tilde{I}$ with $\tilde{Q}$ and the phase of $\tilde{Q}$ to be 90 degrees away from $\tilde{I}$.

Figure 1A:
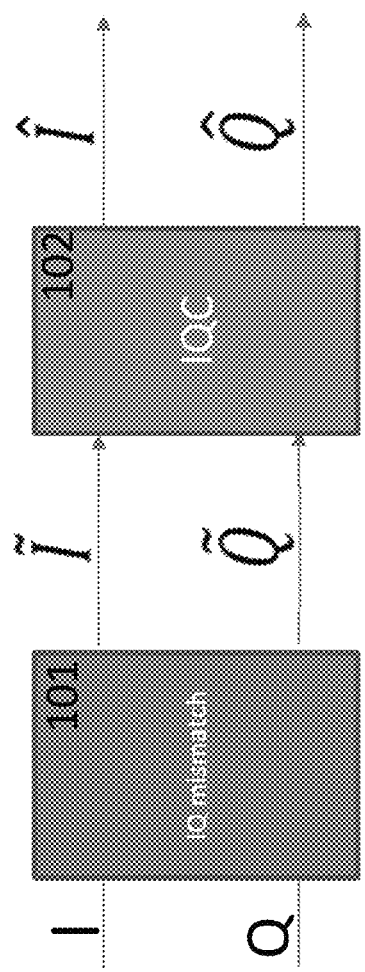
FIG. 1A shows A block diagram for illustrating how to correct mismatch IQ signals according to one embodiment of the present invention.

FIG. 1A shows A block diagram for illustrating how to compensate mismatch IQ signals that are received from I and Q through the IQ mismatched box 101, wherein the mismatch IQ signals, $\tilde{I}$ and $\tilde{Q}$, are received in a baseband receiver, wherein each of $\tilde{I}$ and $\tilde{Q}$ is in digital form, wherein the IQC (IQ Compensation) block 102 receives the mismatch IQ signals: $\tilde{I}$ and $\tilde{Q}$, and generates compensated IQ signals: $\hat{I}$ and $\hat{Q}$, wherein $$\hat{I} = \frac{1}{\varepsilon} * \tilde{I}; \text{ or } \hat{I} = \hat{\varepsilon}_{inv} * \tilde{I}, \text{ wherein } \hat{\varepsilon}_{inv} = \frac{1}{\varepsilon}, \text{ and}$$

-continued
$$\hat{Q} = -\hat{I} * \tan(\hat{\varphi}) + \sec(\hat{\varphi}) * \tilde{Q},$$

wherein ε is the ratio of the amplitude of $\tilde{I}$ to the amplitude of $\tilde{Q}$, and $\hat{\varphi}$ is the phase difference between $\tilde{I}$ and $\tilde{Q}$.

Figure 1B:
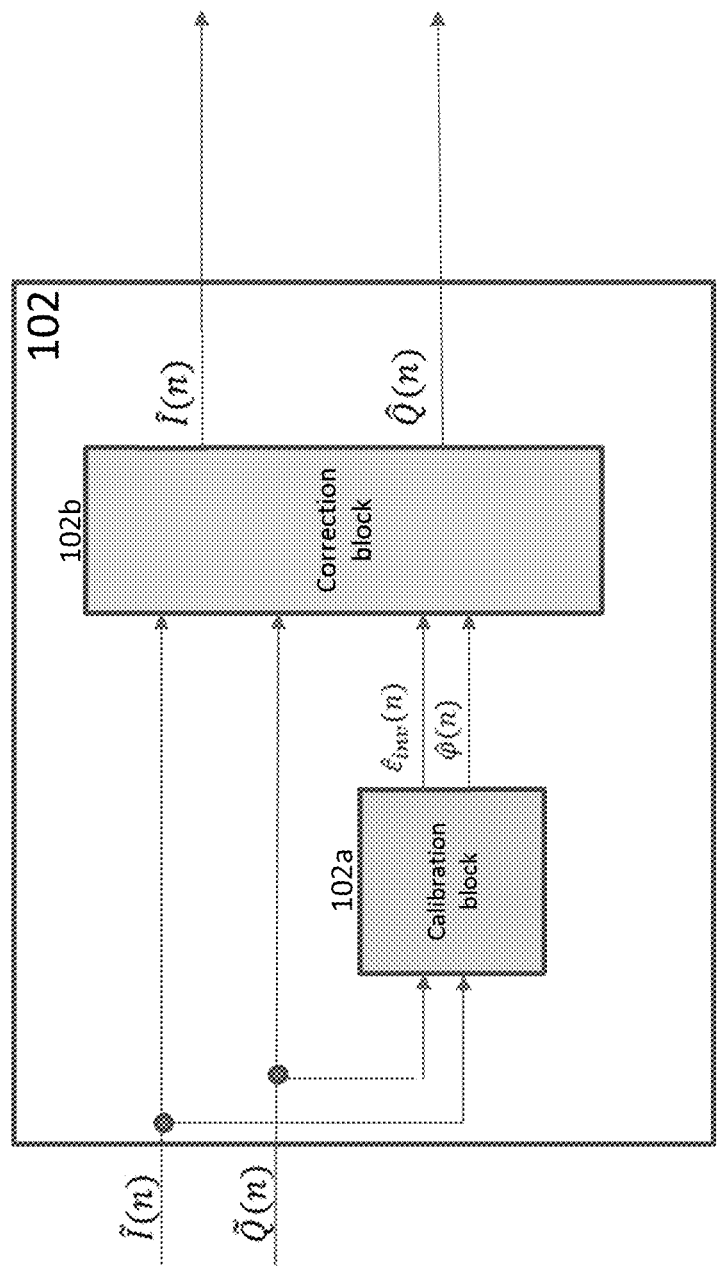
FIG. 1B illustrates a digital circuit for correcting mismatched IQ signals according to one embodiment of the present invention.

FIG. 1B illustrates a digital circuit for correcting mismatched IQ signals, wherein said mismatched IQ signals are represented by in-phase signal: $\tilde{I}$ and quadrature signal: $\tilde{Q}$, wherein each of $\tilde{I}$ and $\tilde{Q}$ is in digital form, wherein the IQC block 102 comprises a calibration block 102a for obtaining the ratio of the amplitude of $\tilde{I}$ to the amplitude of $\tilde{Q}$ for each time n:ε(n) and the phase difference between $\tilde{I}$(n) and $\tilde{Q}$(n) for each time n:$\hat{\varphi}$(n).

As shown in FIG. 1B, the IQC block 102 comprises a correction block 102b, for obtaining compensated signals: $\hat{I}$(n) and $\hat{Q}$(n), wherein $$\hat{I}(n) = \hat{\varepsilon}_{inv}(n) * \tilde{I}(n), \text{ wherein } \hat{\varepsilon}_{inv}(n) = \frac{1}{\varepsilon}(n); \text{ and}$$

$$\hat{Q}(n) = -\hat{I}(n) * \tan(\hat{\varphi}(n)) + \sec(\hat{\varphi}(n)) * \tilde{Q}(n).$$

Figure 1C:
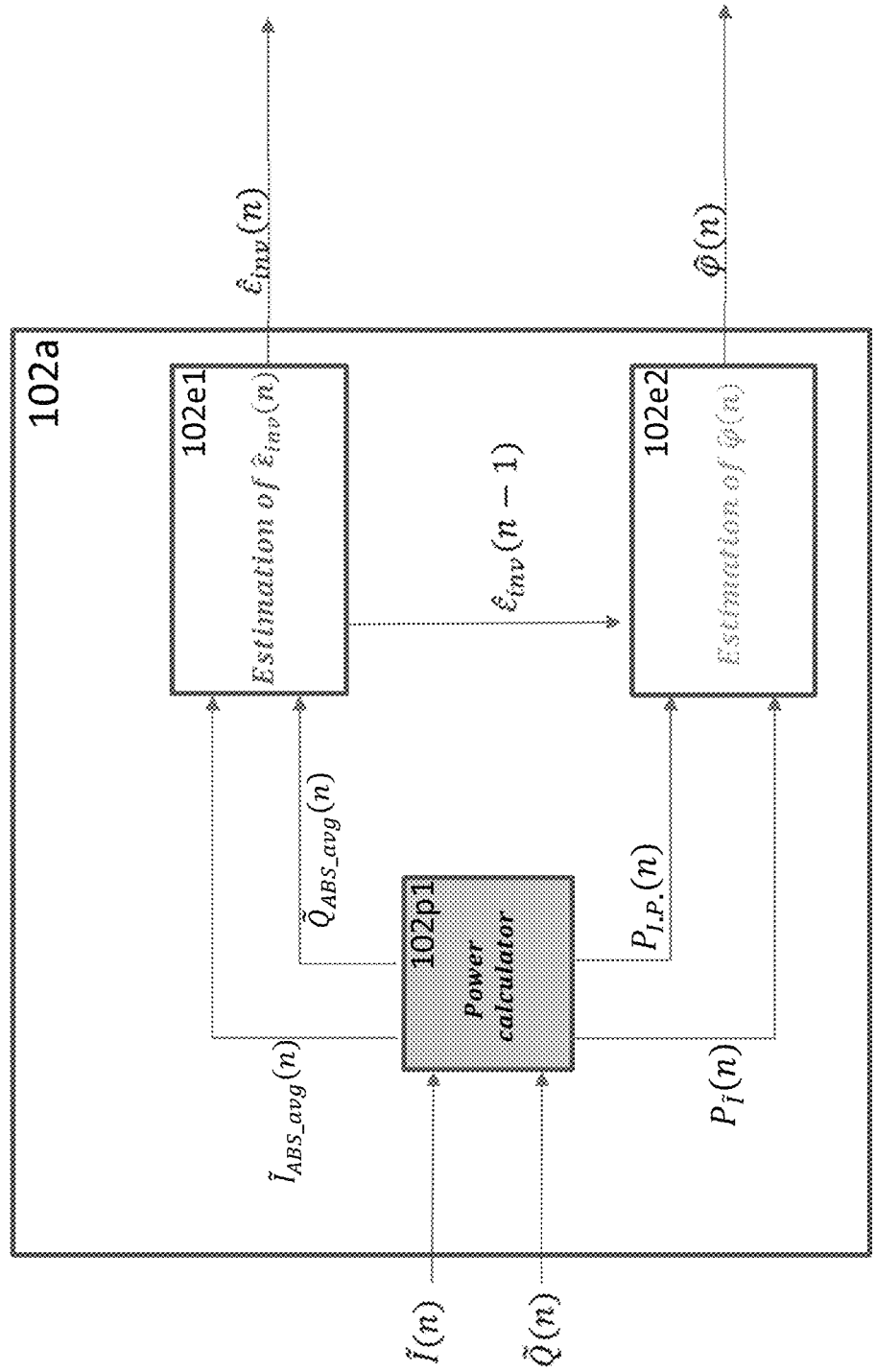
FIG. 1C illustrates a digital calibration circuit according to one embodiment of the present invention.

As shown in FIG. 1C, the calibration block 102a comprises a power calculator block 102p1 that receives the signals $\tilde{I}$ and $\tilde{Q}$ and generates:

$\tilde{I}_{ABS\_avg}(n)$, $\tilde{Q}_{ABS\_avg}(n)$, $P_{I,P}(n)$, and $P_{\tilde{I}}(n)$, wherein $\tilde{I}_{ABS\_avg}(n)$=Average(|$\tilde{I}$(n)|);

$\tilde{Q}_{ABS\_avg}(n)$=Average(|$\tilde{Q}$(n)|);

$P_{I,P}(n)$=Average($\tilde{I}$(n)*$\tilde{Q}$(n)), wherein * represents multiply in this document; and $P_{\tilde{I}}(n)$=Average(($\tilde{I}$(n))$^2$).

Please note that in this document,

Average(x(n)),n=0, 1, 2, 3 . . . is defined in below:

Average(x(0))=x[0], for n=0; and $$\text{Average}(x(n)) = \text{Average}(x(n-1)) + \frac{1}{\text{Divider}} * (x[n] - \text{Average}(x[n-1])),$$

for n=1, 2, 3 . . . , wherein Divider is a constant and can be stored in a register that can be programmed by software.

For example, $\tilde{I}_{ABS\_avg}(n)$=Average(|$\tilde{I}$(n)|) is defined as:

$$\text{Average}(|\tilde{I}(0)|) = |\tilde{I}(0)|, \text{ for } n = 0;$$

$$\text{and Average}(|\tilde{I}(n)|) = \text{Average}(|\tilde{I}(n-1)|) +$$

$$\frac{1}{\text{Divider}} * (|\tilde{I}(n)| - \text{Average}(|\tilde{I}(n-1)|)), \text{ for } n = 1, 2, 3....$$

As shown in FIG. 1C, the calibration block 102a comprises a first estimation block 102e1 for estimating $\hat{\varepsilon}_{inv}$(n), wherein the first estimation block 102e1 receives $\tilde{I}_{ABS\_avg}$(n) and $\tilde{Q}_{ABS\_avg}$(n) and generates $\hat{\varepsilon}_{inv}$(n) by:

$$\hat{\varepsilon}_{inv}(n) = \text{Average}\left(\frac{\tilde{Q}_{ABS\_avg}(n)}{\tilde{I}_{ABS\_avg}(n)}\right).$$

As shown in FIG. 1C, the calibration block 102a comprises a second estimation block 102e2 for estimating $\hat{\varphi}$(n), wherein the second estimation block 102e2 receives $P_{I,P}$(n), $P_{\tilde{I},P}$(n) and $\hat{\varepsilon}_{inv}$(n−1), and generates $\hat{\varphi}$(n) by:

$$\hat{\varphi}(n) = \text{Average}\left(\frac{P_{I,P}(n)}{\hat{\varepsilon}_{inv}(n-1) * P_{\tilde{I}}(n)}\right).$$

Figure 1D:
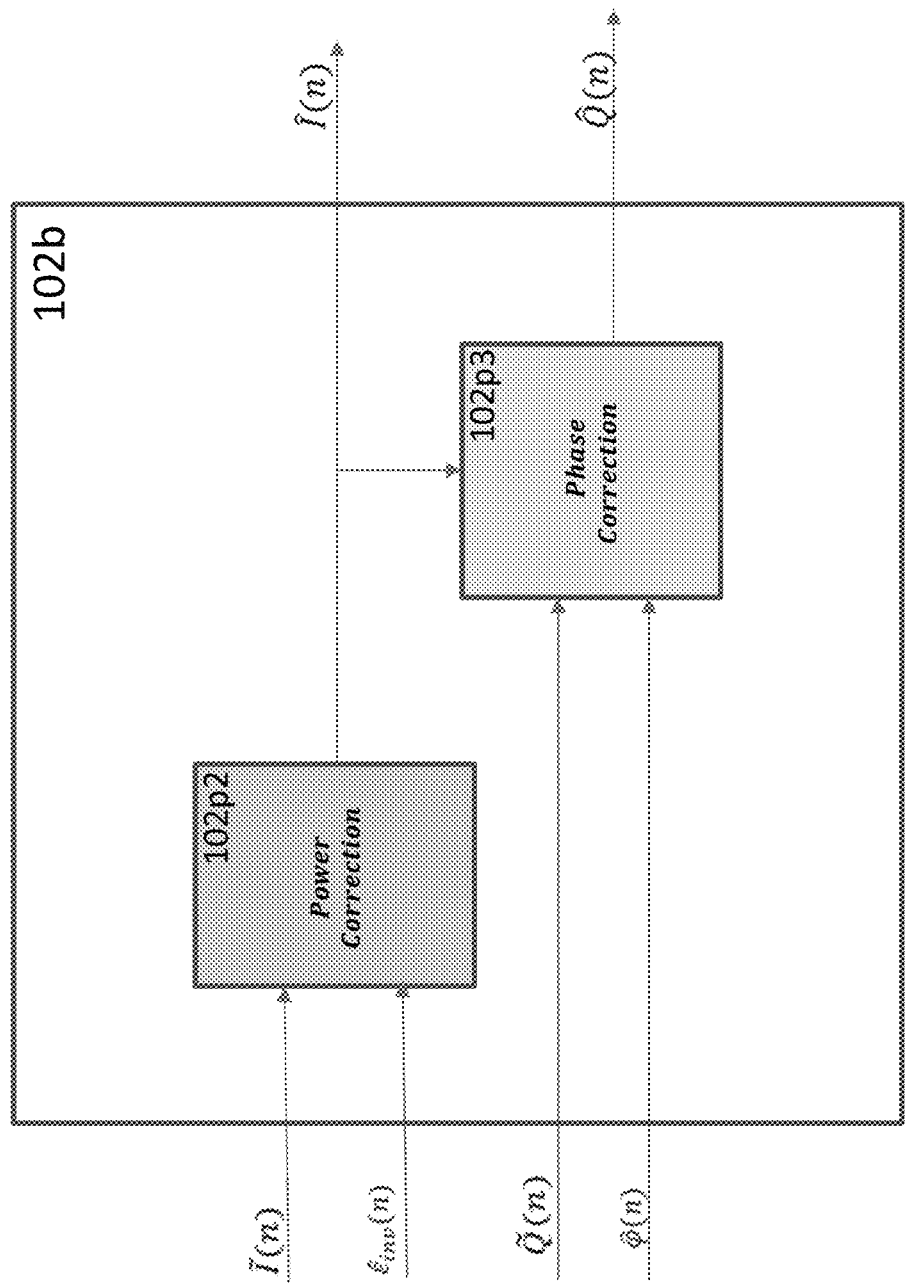
FIG. 1D illustrates a digital correction circuit according to one embodiment of the present invention.

As shown in FIG. 1D, the IQC block 102 comprises a power correction block 102p2 and a phase correction block 102p3, wherein the power correction block 102p2 receives $\tilde{I}$(n) and $\hat{\varepsilon}_{inv}$(n) and generates $\hat{I}$(n), and the phase correction block 102p3 receives $\hat{\varphi}$(n), $\tilde{Q}$ and $\hat{I}$(n) and generates $\hat{Q}$, wherein $\hat{I}(n)=\hat{\varepsilon}_{inv}(n)*\tilde{I}(n);$ and $\hat{Q}(n)=-\hat{I}(n)*\tan(\hat{\varphi}(n))+\sec(\hat{\varphi}(n))*\tilde{Q}(n).$ The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A digital circuit for compensating mismatched IQ (In-phase and Quadrature) signals in a baseband receiver, wherein said mismatched IQ signals are represented by in-phase signal: $\tilde{I}$ and quadrature signal: $\tilde{Q}$, wherein each of $\tilde{I}$ and $\tilde{Q}$ is in digital form, wherein the digital circuit comprises:

a calibration block, for obtaining the ratio of the amplitude of $\tilde{I}$ to the amplitude of $\tilde{Q}$ for each time n:ε(n) and the phase difference between $\tilde{I}$ and $\tilde{Q}$ for each time n:$\hat{\varphi}$(n), wherein $$\hat{\varepsilon}_{inv}(n) = \frac{1}{\varepsilon(n)};$$

and a correction block, for obtaining compensated signals: $\hat{I}$ and $\hat{Q}$, wherein, for each time n=0, 1, 2, 3 . . . , $\hat{I}(n)=\hat{\varepsilon}_{inv}(n)*\tilde{I}(n).$ 2. The digital circuit according to claim 1, wherein in the correction block, for obtaining compensated signals: $\hat{I}$ and $\hat{Q}$ wherein, for each time n=0, 1, 2, 3 . . . , $\hat{I}(n)=\hat{\varepsilon}_{inv}(n)*\tilde{I}(n),$ and $\hat{Q}(n)=-\hat{I}(n)*\tan(\hat{\varphi}(n))+\sec(\hat{\varphi}(n))*\tilde{Q}(n).$ 3. The digital circuit according to claim 2, wherein the calibration block comprises a power calculator block that receives the signals $\tilde{I}$ and $\tilde{Q}$ and generates:

$\tilde{I}_{ABS\_avg}(n)$, $\tilde{Q}_{ABS\_avg}(n)$, $P_{I,P}(n)$, and $P_{\tilde{I}}(n)$, wherein $\tilde{I}_{ABS\_avg}(n) = \text{Average}(|\tilde{I}(n)|);$ $\tilde{Q}_{ABS\_avg}(n) = \text{Average}(|\tilde{Q}(n)|);$ -continued $$P_{I.P.}(n) = \text{Average}(\tilde{I}(n) * \tilde{Q}(n)); \text{ and}$$

$$P_{\tilde{I}}(n) = \text{Average}((\tilde{I}(n))^2), \text{ wherein}$$

$$\hat{\varepsilon}_{inv}(n) = \text{Average}\left(\frac{\tilde{Q}_{ABS\_avg}(n)}{\tilde{I}_{ABS\_avg}(n)}\right), \text{ and}$$

$$\hat{\varphi}(n) = \text{Average}\left(\frac{P_{I.P.}(n)}{\hat{\varepsilon}_{inv}(n-1) * P_{\tilde{I}}(n)}\right).$$

4. The digital circuit according to claim 3, wherein the correction block comprises a power correction block and a phase correction block, wherein the power correction block receives $\tilde{I}(n)$ and $\hat{\varepsilon}_{inv}(n)$ and generates $\hat{I}(n)$, and the phase correction block receives $\hat{\varphi}(n)$, $\tilde{Q}$ and $\hat{I}(n)$ and generates $\hat{Q}$, wherein $$\hat{I}(n) = \hat{\varepsilon}_{inv}(n) * \tilde{I}(n); \text{ and}$$

$$\hat{Q}(n) = -\hat{I}(n) * \tan(\hat{\varphi}(n)) + \sec(\hat{\varphi}(n)) * \tilde{Q}(n).$$

\* \* \* \* \*